Aug. 16, 1966   F. M. BAILEY ET AL   3,267,259
FREIGHT CAR IDENTIFICATION SYSTEM

Filed Jan. 23, 1962   14 Sheets-Sheet 1

INVENTOR.
FRANCIS M. BAILEY
RICHARD K. DAVIS
BY
ATTORNEY

FIG.3
AMPLIFIER
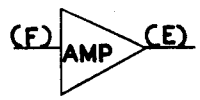
FIG.3A
LOGIC AMPLIFIER
FIG.3B
AND
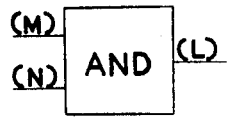
FIG.3C
AND NOT
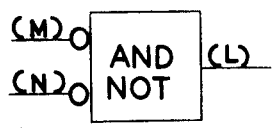
FIG.3D
COUNTER
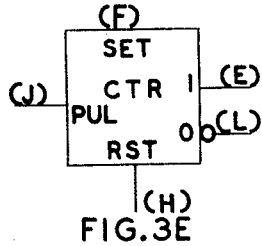
FIG.3E
INVERTER
FIG.3F
INVERTING OR
FIG.3G
ONE SHOT
FIG.3H
OR CIRCUIT
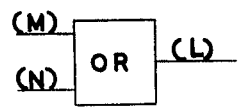
FIG.3I
SHIFT REGISTER
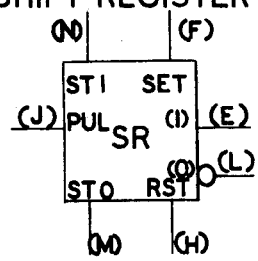
FIG.3J
FLIP FLOP
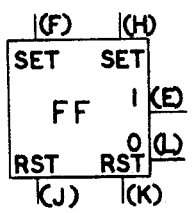
FIG.3K
TRIGGER
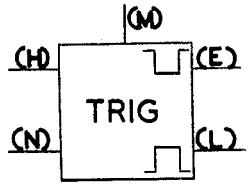
FIG.3L
TIME DELAY
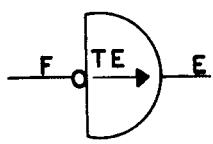
FIG.3M
NEON
FIG.3N

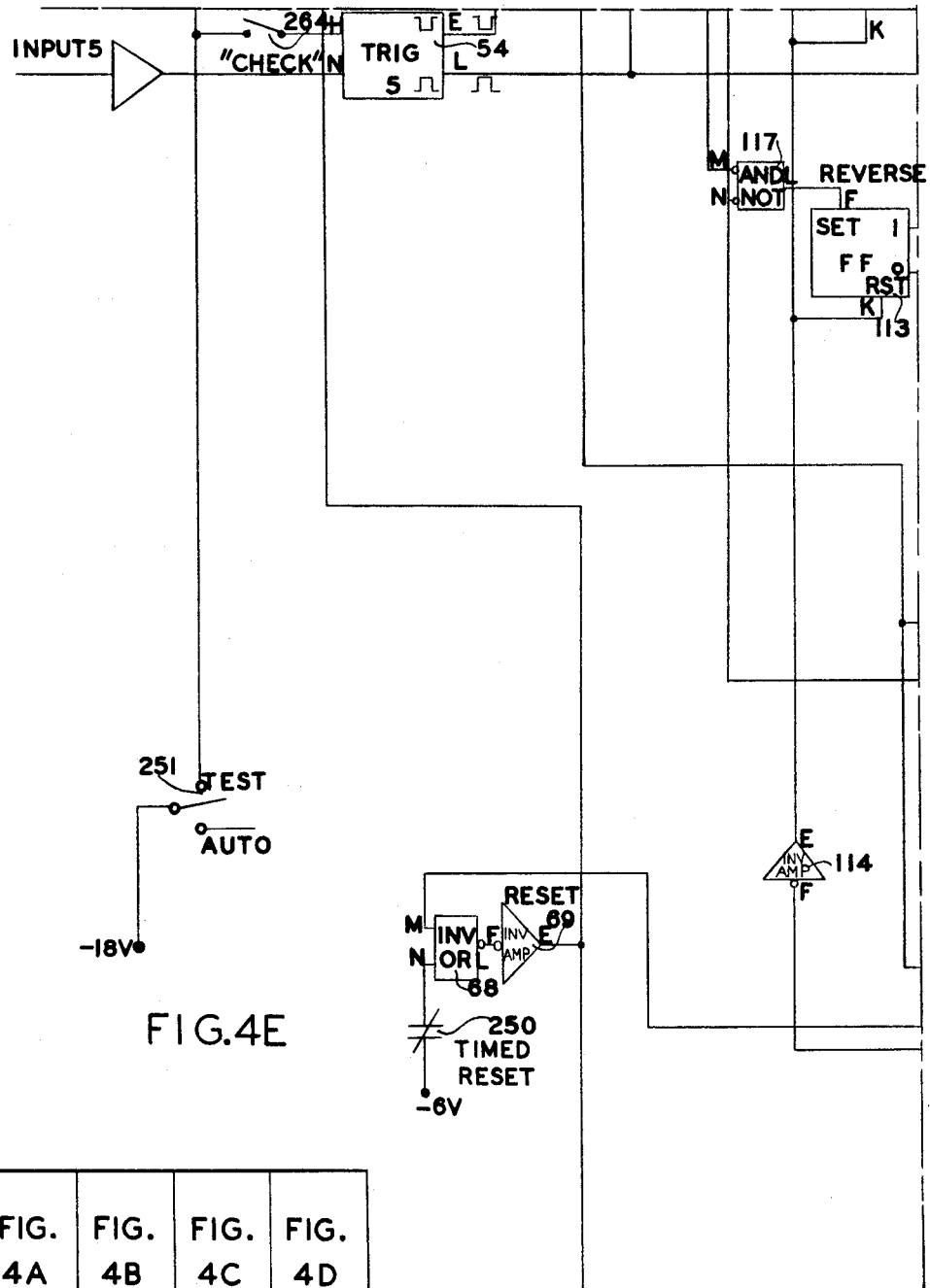

Aug. 16, 1966  F. M. BAILEY ET AL  3,267,259
FREIGHT CAR IDENTIFICATION SYSTEM
Filed Jan. 23, 1962  14 Sheets-Sheet 5

INVENTOR.
FRANCIS M. BAILEY
RICHARD K. DAVIS
BY
Jim Comfort
ATTORNEY

INVENTOR.
FRANCIS M. BAILEY
RICHARD K. DAVIS
ATTORNEY

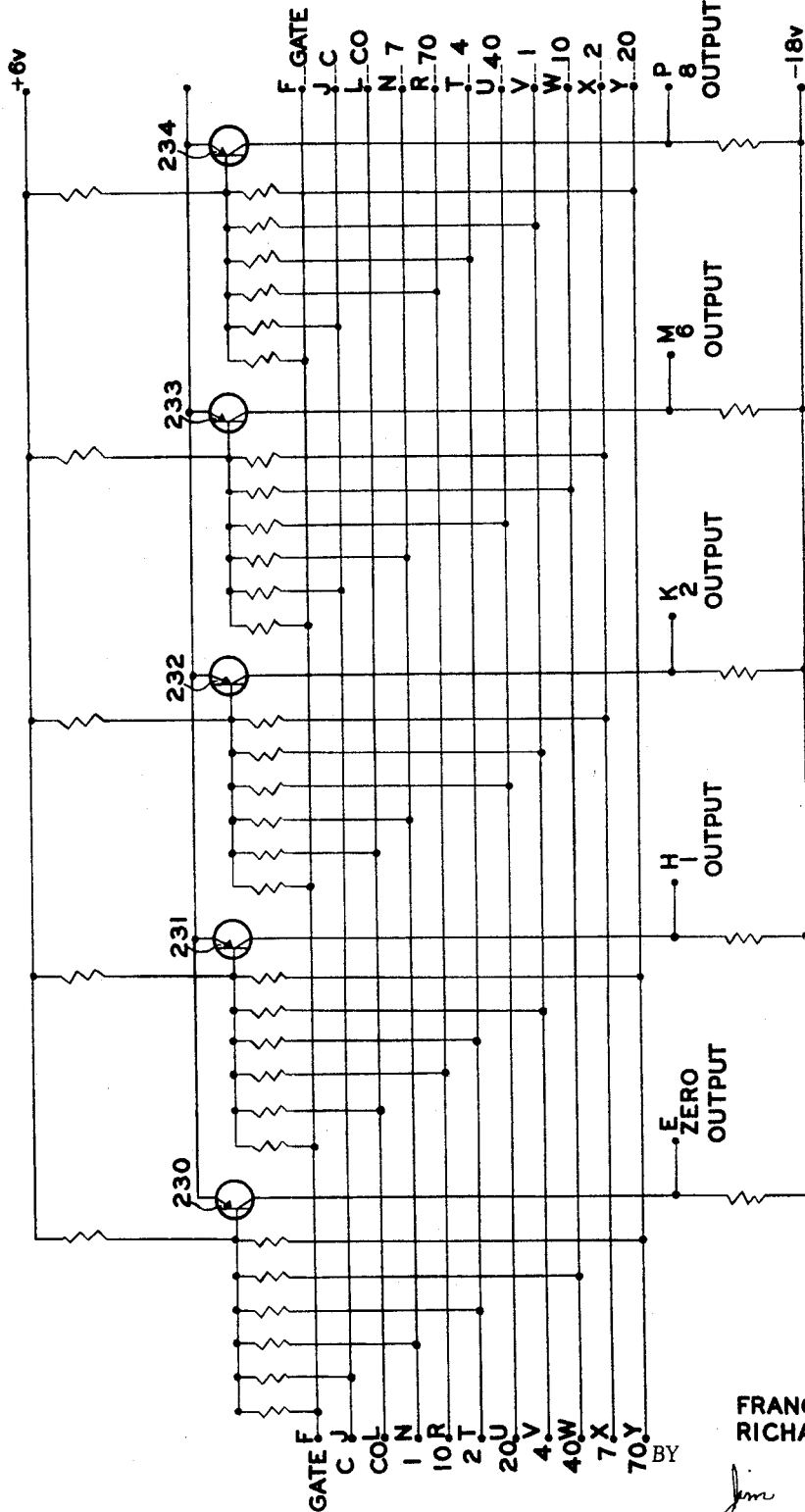

Aug. 16, 1966   F. M. BAILEY ET AL   3,267,259
FREIGHT CAR IDENTIFICATION SYSTEM
Filed Jan. 23, 1962   14 Sheets-Sheet 13

INVENTOR.
FRANCIS M. BAILEY
RICHARD K. DAVIS
BY
ATTORNEY

Aug. 16, 1966  F. M. BAILEY ET AL  3,267,259
FREIGHT CAR IDENTIFICATION SYSTEM
Filed Jan. 23, 1962  14 Sheets-Sheet 14

INVENTOR.
FRANCIS M. BAILEY
RICHARD K. DAVIS
BY
ATTORNEY

United States Patent Office 3,267,259
Patented August 16, 1966

3,267,259
FREIGHT CAR IDENTIFICATION SYSTEM
Francis M. Bailey and Richard K. Davis, Roanoke, Va., assignors to General Electric Company, a corporation of New York
Filed Jan. 23, 1962, Ser. No. 168,167
10 Claims. (Cl. 235—61.11)

This invention relates to a data communication system and more particularly to a data communication system for communicating data between two locations during relative movement between the two locations. In the preferred embodiment described herein the communication is between a moving object such as a railroad car and a fixed location such as a fixed wayside location.

During relative movement between two locations, it is often desirable to communicate data between the locations. For example, one of the primary problems in railway freight handling has been the manner in which the freight car has been identified. The freight car must be identified many times before it reaches its destination. Many devices have been proposed to automatically identify the freight cars in a train as the train passes a particular wayside location. Yet in practice, identification numbers on the side of each freight car are visually read while the freight cars are stopped or traveling at a slow speed and each identification number written down, as has been the practice for many years. Such practice has been and continues to be time consuming and subject to errors.

It is therefore an object of this invention to provide a new and improved communication system for communicating data from one location to another during relative movement between the two locations.

Another object of this invention is to provide a new and improved communication system for automatically communicating data from a moving freight car to a fixed wayside location quickly and accurately.

For an effective identification system, each freight car must be equipped to operate in the identification system. Most sysetms proposed heretofore for communicating identification data from the freight car to a fixed wayside location have required that a relatively expensive device (e.g. a radio transmitter) be included in each freight car. At the present time, there are approximately two million freight cars in service and to equip each freight car with relatively expensive devices for operation in the identification system would be extremely costly.

It is therefore an object of this invention to provide a new and improved freight car identification system having a relatively inexpensive device on the freight car.

In accordance with the principles of this invention data is communicated from one location to a second location during relative movement between the two locations. A predetermined pattern is presented at the first location and is read during relative movement between the two locations. Data signals are derived from the predetermined pattern and are stored in a memory. The storing of the data signals and their reading out is controlled by the data signals.

When data signals are entered into a memory serially, the data signals already read into the memory must be shifted to the next succeeding storage positions to allow the succeeding data signals to be read into the memory. Accordingly, after each data signal has been stored in the first storage position, each identification number is automatically shifted into a subsequent storage position.

It is therefore an object of this invention to provide a new and improved communication system for automatically shifting each data signal to the next succeeding storage position of the memory after entry of the data.

Such a communication system is accurate and the data is communicated automatically from one location to the other location. If the predetermined pattern is placed on the moving object such as a freight car, the cost of the system is relatively low.

Freight cars are connected in a train so that the freight cars may be moving in a forward or reverse direction, and it is another object of this invention to provide a new and improved data communication system for communicating data between a fixed location and a moving object, whether the object is moving forward or reverse.

Accordingly, the predetermined pattern is read and data signals and an order signal, indicating whether the data signals have been read in a forward or reverse order, are derived from the predetemined pattern. The data signals are stored in the memory, and responsive to the order signal, are read out in a forward order. In such manner, the data is read out of the communication system in a forward order, whether it was read in a forward or reverse order.

It is important that all communication systems be accurate. This is particularly true in identification systems for identifying moving objects such as freight cars. It is important that only the predetermined pattern on the moving object cause signals to be produced in the system. In many types of reading devices such as photoelectric devices, transient conditions may cause erroneous signals to be produced.

It is therefore an object of this invention to provide a new and improved identification system for reading only the intended identification signals.

Accordingly, identification signals are not stored in the memory until a start signal has been derived from the predetermined pattern.

In addition, the memory may be closed after a stop signal has been derived from the predetermined pattern.

As the identification signals may be read in either a forward or reverse order, the start signal derived from the predetermined pattern, when the predetermined pattern is read in a forward order, may serve as a stop signal when the predetermined pattern is read in a reverse order; and the start signal derived from the predetermined pattern, when read in a reverse order, may serve as a stop signal when the predetermined pattern is read in a forward order.

To insure that the correct identification number has been read, the identification number may be designed so that it is represented by two, and only two, identification signals, and an error indication is read out if other than two identification signals are present for each identification number.

Such a system insures that only the intended identification signals are introduced into the identification sytsem.

The data is communicated from one location to the other location at a faster rate than it is possible to mechanically print out or punch out the data. Therefore, it is an object of this invention to provide a new and improved buffer storage apparatus for temporary storage of the communicated data.

Accordingly, the data is received and stored in a storage device. The storage and read-out of the data is controlled by the data signals.

The data may be received either in a forward or reverse order, and it is desirable to read the data out in a forward order. It is an object of this invention to provide new and improved buffer storage apparatus for receiving data in a forward or reverse order and delivering the data in a forward order.

Accordingly, an order signal is included in each batch of data received; and after the data is stored, the order signal causes the data to be read out in a forward order whether read in a forward or reverse order.

It is desiable that only the desired data be received by the buffer storage device, and it is therefore an object of this invention to provide a new and improved buffer storage system that will accept only the desired data.

Accordingly, a start signal is provided before each batch of data which causes the buffer storage apparatus to open. In addition, a stop signal may close the buffer storage apparatus after a batch of data has been received.

The novel features of the invention are set forth with particularity in the appended claims. The invention itself, however, both as to its organization and method of operation, together with further objects and advantages thereof, may best be understood by referring to the following description and the accompanying drawings.

In the figures:

FIGURES 3a through 3n show the block symbols for the elements used in communication system.

FIGURES 4a through 4h, when put together in the manner shown in FIGURE 4, show a detailed schematic of the identification system.

FIGURE 5 is a schematic of a binary to decimal converter.

Figure 6:
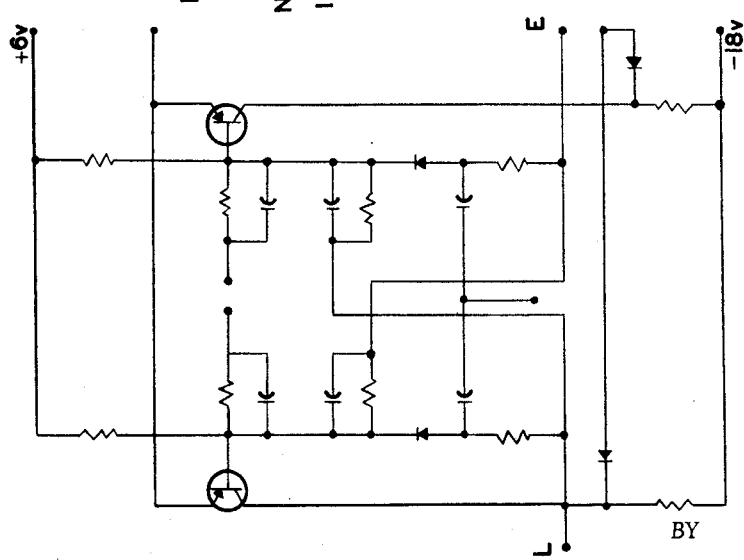

FIGURE 6 is a schematic of a binary counter.

Figure 7:
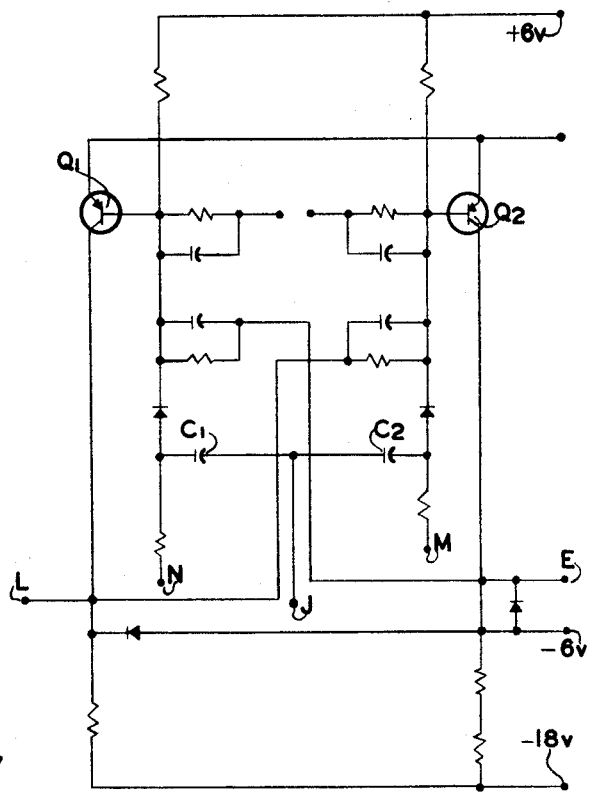

FIGURE 7 is a schematic of a shift register.

Figure 8:
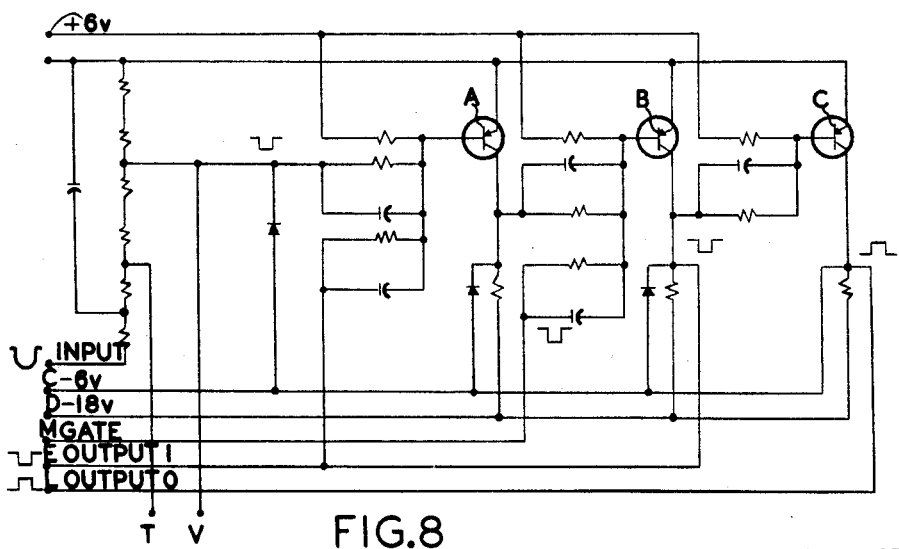

FIGURE 8 is a schematic of a trigger circuit.

Figure 9:
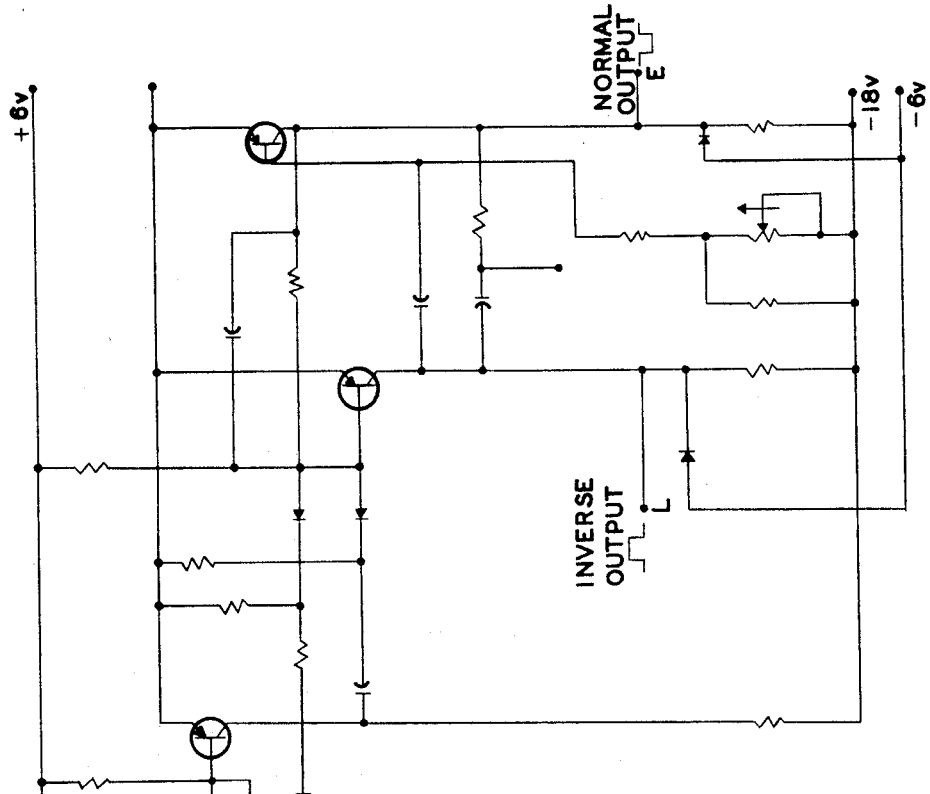

FIGURE 9 is a schematic of a one shot pulse generator.

Figure 1:
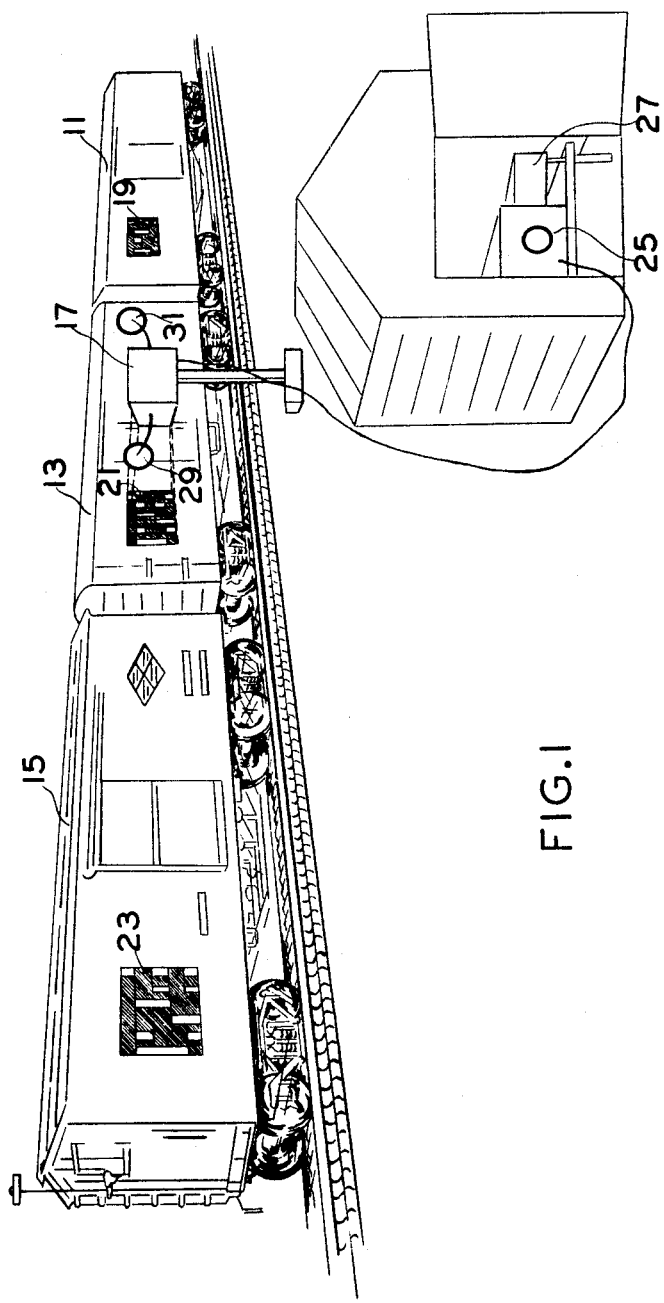
FIGURE 1 shows a freight train passing an identification system.

For a better understanding of this invention, three freight cars 11, 13 and 15 are shown in FIG. 1 moving toward the left of the page past a camera 17. Each freight car has a coded pattern 19, 21 and 23, respectively, which includes a start signal, identification numbers, and a stop signal. As each freight car passes, the camera 17 reads the coded pattern and delivers signals derived from the pattern to the logic unit. The start signal opens the logic unit 25 and the identification signals are stored in a memory unit. The stop signal closes the logic unit 25 so that no more signals are stored and causes the identification numbers to be decoded and be punched out in a paper tape punch 27. The start and stop signals indicate if the identification numbers are read in a forward order of a reverse order, and cause all identification numbers to be read out in a forward order. The stop signals act as order signals indicating the order in which the numbers are read.

The coded pattern is put on both sides of each freight car so that the identification number may be read on either side without regard to the direction of travel of the train. For proper operation, the coded pattern should be on correspodning positions on each side.

The coded pattern consists of light reflecting areas and nonlight reflecting areas. For best results, the light reflecting areas should be a highly reflective surface. To insure adequate light illumination and reliability, two lamps 29 and 31 are provided and energized before the freight car passes the wayside station. The reflected light is read by the camera 17 at the same height of the coded pattern. The camera 17 contains a plurality of photocells which are actuated when they receive the reflected light to produce a signal.

The camera 17 is supported on a stand 33 securely fastened to the ground.

The operation of the system will be described in more detail hereinafter.

The identification on the moving object consists of a start number signal, a plurality of coded numbers, and a stop number signal.

The first number read serves as the start signal and the last number read serves as the stop signal. As the identification may be read in forward and reverse directions, the first number read in a forward direction serving as a start signal also is the last number read in a reverse direction and must serve as a stop signal in the reverse direction.

Conversely, the last number read in a forward direction, serving as a stop signal in a forward reading, is the first signal read in a reverse direction and must serve as a start signal in a reverse reading. The two number signals are thus called start forward-stop reverse signal and start reverse-stop forward signals.

Figure 2:
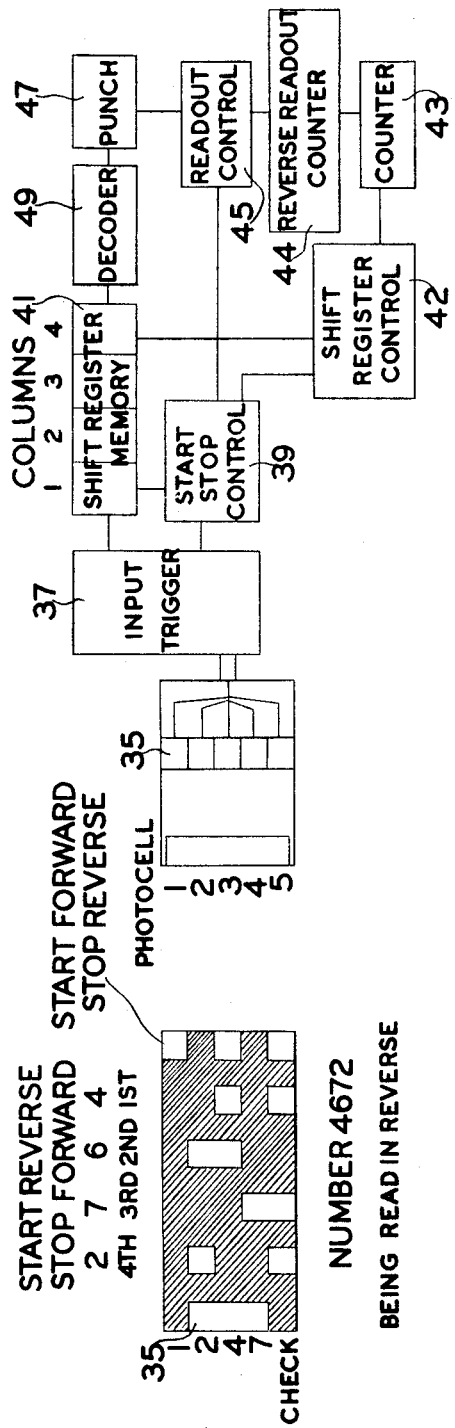
FIGURE 2 shows a block diagram of the communication system.

Thus, referring to FIG. 2 an identification pattern 35 having a start forward-stop reverse number signal, four coded numbers, and a start reverse-stop forward signal is shown. The five photocells in the camera correspond to the five rows, and reflective material in a row will reflect the light and actuate a corresponding photocell.

The coded areas for the different numbers and the start-stop signals are tabulated below:

| Representations: | Coded as— |
|---|---|
| Start forward-stop reverse | 1, 4, check |
| Start reverse-stop forward | 2, 4, 7 |
| 0 | 4, 7 |
| 1 | 1, check |
| 2 | 2, check |
| 3 | 1, 2 |
| 4 | 4, check |
| 5 | 1, 4 |
| 6 | 2, 4 |
| 7 | 7, check |
| 8 | 1, 7 |
| 9 | 2, 7 |

The start-forward or start-reverse signal is shaped by the input triggers 37 and applied to the start-stop control 39 to open the shift register memory 41 and set up the rest of the system to receive the first coded number.

The read-in of the coded numbers is the same whether they are received in the correct or reverse order. The first number is read into the first column of the shift register memory 41 and shifted into the second column by the shift register control 43. The second number is read in and the first and second numbers are shifted into the second and third columns, respectively. The third number is read in and the first, second and third numbers are shifted into the second, third and fourth columns, respectively, and the fourth number is read into the first column so that the first, second, third and fourth numbers rest in the first, second, third and fourth columns, respectively. After every shift of numbers in shift register memory 41, the counter 43 counts to one; and after the third shift, the counter 43 stops further shifts of the numbers in the shift register memory 41. After the fourth number has been read into the shift register memory 41, the shift register memory 41 is closed so that no further numbers may be read into the shift register memory 41. The shift register memory 41 is provided with a sufficient number of columns of bits to accommodate the bits in the identification number read.

The read-out or punch-out of the identification data in this particular embodiment is different, depending on whether the number was read in a forward or reverse order, and will be described separately.

The read-out of the numbers resting in the shift register memory 41 in the forward order will be described first. The stop-forward signal is shaped by the input triggers 37 and applied to the start-stop control 39 to set up the read-out control 45 for the read-out. The counter 43 is reset and the punch 47 is opened to receive the numbers as they are read out. The first number read into the shift register memory 41 now resting in the fourth column is decoded in decoder 49 and punched out, the numbers in columns one, two and three of the shift register memory are shifted to the second, third and fourth columns, and the counter 43 counts to one. The three other numbers are punched out in the same manner, the remaining numbers being shifted one column to the right after each punch-out; and the counter 43 counting a one after each punch-out.

After all four numbers have been punched out and the counter 43 has counted to four, the carriage return punch is automatically punched out; and the system is reset to receive the next number. The decoder 49 insures that each identification number is derived from two, and only two, signals; and if the identification number is derived from other than two signals, an error identification is punched out automatically.

The read-out of numbers resting in the shift register memory 41 in the reverse order will be described next. The stop-reverse signal is received by the input triggers 37 and applied to the start-stop control 39 to set up the read-out control 45 system for the read-out.

The counter 43 is reset. All numbers in the shift register memory 41 are shifted to the right with the numbers in the first, second, third and fourth columns shifted to the second, third, fourth and first columns, respectively; and the counter 43 counts one. The shifting and counting continues for three shifts until the numbers originally in the first, second, third and fourth columns have been shifted to the fourth, first, second and third columns, respectively, and counter 43 has counted to three. Then the number in the fourth column is decoded and punched out. Counter 43 is reset and the numbers are all shifted three times again until the numbers originally in the first, second, third and fourth columns have been shifted to the third, fourth, first and second columns, respectively.

Again the number in the fourth column is punched out so that the first and second numbers have been punched out. The numbers are shifted three times again, the third number is punched out; again the numbers are shifted three times and the fourth number is punched out. In this manner, the numbers originally read into the shift register memory in a reverse order are read out in a forward order. After each number is punched out, reverse read-out counter 44 counts one. After all four numbers have been punched out and the counter 44 has counted to four, the carriage return punch is automatically punched out; and the system is reset to receive the next number.

FIGURES 3a through 3n show the symbols used in the schematic of the identification system shown in FIGURE 4.

AMPLIFIER

FIGURE 3a shows the symbol for the light amplifier or the relay amplifier. The same symbol is used for both. Which one is intended is indicated by its load. A signal on terminal F will cause current to flow in a load connected between terminal E and the negative power bus.

LOGIC AMPLIFIER

FIGURE 3b shows the symbol for the logic or inverting amplifier. No signal on input terminal F will produce an output signal on terminal E.

It should be noted that every place that a circle appears, an inversion occurs. It follows that two circles directly in series cancel the effect of the inversion. An even number of circles in any given leg of the circuit results in a direct function, whereas an odd number of circles denotes an inversion.

In all of the elements shown, input terminals are usually shown on the left side of the symbols and output terminals are shown on the right side of the symbols. In all static switching circuits, a signal is defined as a D.-C. voltage between −6 and −18 volts and no signal is defined as a D.-C. voltage between 0 and −0.4 volts.

AND CIRCUIT

FIGURE 3c shows the symbol for the AND circuit. Its operation is such that an input signal on the input terminal M and on input terminal N will produce an output signal on output terminal L. This symbol may have two or more input terminals.

AND/NOT CIRCUIT

FIGURE 3d shows the symbol for the AND/NOT circuit. Its operation is such that no signal on terminal M and no signal on terminal N will produce an output signal on terminal L. This unit may have two or more input terminals. Positive pulses received on all terminals are effectively the same as no signals received, and a signal is produced on the output terminal.

COUNTER

FIGURE 3e shows the symbol for a counter bit. A signal applied to terminal H sets counter bit to 1 so that a signal appears at output terminal E. This signal at output terminal E will be maintained after the set signal is removed and remains at the 1 state until a signal is applied to terminal H, the reset terminal, at which time a signal on terminal E is removed and a signal appears on terminal L. The unit will remain in this, the zero state, until a set signal is again applied. In addition, a pulse on input terminal J will complement the element, changing the state of the element from the previous state. The shift of signals from terminals E to L, or L to E, occurs on the positive going side of the input signal. Terminals E and L are always the inverse of each other unless a signal is simultaneously applied to the set and reset terminals in which case no output signal will be present.

INVERTER

FIGURE 3f shows the basic symbol for the inverter. An output signal is produced on terminal E if no signal is received on terminal F and no signal is produced on terminal E if a signal is received on terminal F.

INVERTING OR CIRCUIT

FIGURE 3g shows the symbol for the inverting OR circuit. Its operation is such that an input signal on terminal M or on terminal N will turn off the output signal on terminal L. This circuit performs the same function as the simple OR circuit except that the small circle is added to the output to denote the inverted sense of the output signal.

ONE SHOT PULSE GENERATOR

FIGURE 3h shows the symbol for a one shot pulse generator. An input, a negative going pulse or a negative going step change in a D.-C. input to terminal F or a positive going pulse or a positive going step change in a D.-C. input to terminal M will cause a pulse to be produced at terminal E with a negative going leading edge and also a pulse to be produced at terminal L with a positive going leading edge. Both output pulses are available at the same time with a signal on either input terminal.

OR CIRCUIT

FIGURE 3i shows a symbol for an OR circuit. Its operation is such that an input signal on terminal M or on terminal N will produce an output signal on terminal L. This symbol may have two or more input terminals.

SHIFT REGISTER

FIGURE 3j shows a symbol for a shift register element. If a signal is applied to terminal F, the shift register is set to 1; and a signal will appear at terminal E. This signal will be maintained after the set signal is removed. The unit will remain in this state until it is reset. If a signal is applied to terminal H, the shift register is reset to zero and signal will appear on terminal L. The unit will remain reset with a signal on terminal L until it is set. If the set and reset signals are applied simultaneously, both the signals on terminals E and L will be removed. In addition, if a signal is applied to terminal N (the steer 1 terminal) and a pulse is applied to terminal J, the unit will be left with a signal on terminal E and set to 1. If a signal is applied to terminal M (the steer 0 terminal) and a pulse is applied to terminal J, the unit will be reset and left with a signal on terminal L. The shift of signal from terminals E to L occurs on the positive going side of the pulse. Terminals E and L are always the inverse of each other unless a signal is simultaneously applied to the set and reset terminals in which case no output signal will be present.

FLIP-FLOP

FIGURE 3k shows the symbol for the flip-flop element. If a signal is applied to terminal F or H (the set terminals), the flip-flop will be set to 1 with a signal appearing at terminal E. This signal will be maintained after the set signal is removed with the flip-flop remaining set at 1. The unit will remain in this state until a signal is applied to terminals J or K (the reset terminals) at which time the signal on terminal E is removed and the flip-flop is reset to zero and a signal appears on terminal L. The unit will remain in this state until a signal is applied. If the set and reset signals are applied simultaneously, both E and L signals will be removed and no signal will appear on the output terminals.

TRIGGER

FIGURE 3l shows the symbol for the trigger element. Terminal E normally produces no signal and terminal L produces a signal. The trigger is essentially a pulse shaping element; and whenever a pulse applied to the H or N terminals exceeds approximately 4½ volts, a negative going pulse is delivered from the E terminal and a positive going pulse (effectively no signal) is delivered from the L terminals, simultaneously. Terminal M is a gate terminal; and when a signal is applied to the gate terminal M, no pulses can be produced by the trigger circuit.

TIME DELAY

FIGURE 3m shows the symbol for the time delay element. Its operation is such that a predetermined period of time after a signal is removed from terminal F, a signal will appear on terminal E.

NEON

FIGURE 3n shows the symbol for a neon light. Its operation is such that when a signal is applied to it, it lights for visable observation of the operation of the circuits.

In the schematic of the identification system shown in FIGURE 4, two counters and five shift registers are shown.

COUNTER

The two counters 78 and 146 in FIGURE 4 are each composed of three counter bits. After all counter bits have been reset to "zero" by a signal or input terminal H, the first pulse received by the first counter bit on input terminal J (complement input) sets the counter bit to "one" so that a signal is delivered on the "one" output terminal E to the input terminal J (complement input) of the next counter bit. Thus, the counter has counted to binary one. The next input pulse complements the first counter bit to "zero" causing the next counter bit to complement to "one" as the signal on output terminal E goes positive. Thus, the counter has counted to binary 2 with 010 in the counter. The count continues to a count of binary three (110) in the manner described.

SHIFT REGISTER

Each shift register in FIGURE 4 has four shift register bits. An input signal is applied to terminal F of the first shift register bit in the shift register to set that shift register bit to "one" so that an output signal is produced at the E terminal. The output signal from the E terminal is applied to the N terminal of the next counter bit which is the steer 1 terminal. When the number is to be shifted, a positive pulse is applied to the J input terminal of the next shift register bit to set the next shift register bit to "one."

If the shift register is reset to "zero," an output signal is delivered from the L terminal (zero) to the M terminal (steer 0) of the next shift register bit so that a shift pulse received on terminal J of the next shift register bit causes it to be reset to "zero." In this manner a binary number may be shifted from shift register bit to shift register bit.

DETAILED DESCRIPTION OF THE IDENTIFICATION SYSTEM

The operation of the identification system is different depending whether the identification number on the moving object is read in a forward or reverse direction and will be described separately in the following description.

In the identification system many of the flip-flops, counter bits and shift register bits have their "one" output amplified and applied to a neon so that the neon is ignited when there is a "one" output. The condition of the elements therefore may be visually observed.

SET UP OF APPARATUS BY FORWARD START SIGNAL

As the start signal on an object is read in the forward direction, signals are received by triggers 50, 52 and 54 to produce negative output pulses on terminals E and positive output pulses on terminals L of triggers 50, 52 and 54; so that START-STOP AND/NOT circuit 55 produces an output signal, as no signals are received on its input terminals. The signal produced by START-STOP AND/NOT circuit 55 sets the first START-STOP flip-flop 56 to "one" to produce an output signal on terminal E which is inverted by inverter 57 so that no signal is applied to reset AND/NOT circuit 59 on terminal R and no signal to shift AND/NOT circuit 61 on terminal H. At this time, terminals T and U of reset AND/NOT circuit 59 also have no signal applied. As soon as the pulses produced by the triggers cease, no pulses are applied to OR circuit 63 and no signal is applied to terminal V of reset AND/NOT circuit 59, and thus a signal is applied to reset one shot 65 to produce a positive pulse on terminal L and a negative pulse on terminal E. The positive pulse from terminal L is (1) applied to terminal N of forward AND/NOT circuit 71 to produce a signal to set forward flip-flop 73 to "one," (2) inverted by inverting amplifier 67 and applied to the H terminals (reset) of all of the shift register bits to reset them to "zero" and (3) inverted by inverting amplifier 67, inverted by inverter 68, and inverted by inverting amplifier 69. The negative pulse from terminal E of reset one shot 65 is applied to AND/NOT circuit 74 so that when shift one shot 73 produces a signal from terminal E caused by the start signal, the inverted no signal from inverting amplifier 75 does not cause a signal to be produced by AND/NOT 74 and no count is effected in counter bit 77 of counter 78. The signal from inverting amplifier 69 resets input control flip-flop 125 to "zero" so that no signal is applied to input AND/NOT circuits 130–134 from terminal E, resets reverse shift flip-flop 145 to "zero," resets counter bits 147, 148, 149, 77, 79 and 81 to "zero," and resets stop shift flip-flop 83 to "zero."

The identification apparatus has thus been set up for the receipt of the first number.

RECEIPT OF FIRST NUMBER

For illustrative purposes, assume that the number read by the photocells is 2. Signals are received on the 2 and CHECK input lines, amplified and applied to triggers 51 and 54 to produce positive (no signal) pulses on terminals L and negative (signal) pulses on terminals E of triggers 51 and 54. The positive (no signal) pulses are applied to the N terminals of input AND/NOT circuits 131 and 134 (no signal is applied to the M terminals from terminal E of flip-flop 125) to produce a signal from terminal E of input AND/NOT circuits 131 and 134 and set shift register bits 151 and 181 to "one."

As soon as the negative (signal) pulses from triggers 51 and 54 pass, OR circuit 63 applies no signal to terminal K of shift AND/NOT circuit 61. Terminals F, H and J also have no signal applied so shift AND/NOT circuit 61 delivers a signal to terminal F of shift one shot 73 to produce a negative (signal) pulse on terminal E of shift one shot 73 which is inverted by inverting amplifier 75 and (1) applied to the J input terminals of all of the shift register bits to shift the number in the first column to the second column, and (2) inverted by AND/NOT circuit 74, inverted again by inverter 76, and applied to the J input terminal (complement input) of counter bit 77 to complement that counter bit to "one" so that a count of one rests in counter 78.

The second and third numbers are read into the shift registers in a similar manner. After the second number has been read in, a pulse is generated by shift one shot 73 to shift the numbers in the shift register to the second and third column and to count to two in counter 78. After the third number has been read in, again a pulse is generated by shift one shot 73 to shift the first, second and third numbers in the shift registers into the second, third and fourth columns of the shift registers, and to count to three in the counter 78.

Counter 78, after it has counted to three, has counter bit 77 set to "one," counter bit 79 set to "one," and counter bit 81 reset to "zero." Stop shift AND/NOT circuit 85 thus receives no signal on either input terminal and produces a signal to set stop shift flip-flop 83 to "one" so that a signal is delivered from terminal P of stop shift flip-flop 83 through OR circuit 87 to terminal K of shift AND/NOT circuit 61. The fourth number is read into the first column of the shift register; and as a signal is applied to terminal K of shift AND/NOT circuit 61, no signal is delivered to shift one shot 73 so the numbers are not shifted in the shift registers. All four numbers now rest in the four columns of the shift registers.

Stop shift flip-flop 83 is set to "one" so no signal is produced from terminal W, inverted by time delay 121 to a signal, inverted by inverter 122 to no signal, and no signal is applied to terminal Y of input control AND/NOT circuit 123. The time delay 121 delays the no signal until after the fourth number has been read into the first column of the shift registers.

The negative pulse passed by OR circuit 63, resulting from the fourth number read, causes input control one shot 127 to deliver a positive pulse to terminal M of input control AND/NOT circuit 123 so that no signal is applied to either terminal and a signal is produced to set input control flip-flop 125 to "one." A signal is delivered from terminal E of input control flip-flop 125 to the input terminal M of input AND/NOT circuits 130-134 so that the stop signal will not affect the shift registers.

The stop signal is received by the two, four and seven triggers 51, 52 and 53, delivering positive pulses from terminals to the second START-STOP AND/NOT circuit 89 so that a signal is applied to the second START-STOP flip-flop 91 to set it to "one." The L terminal of the second START-STOP flip-flop 91, therefore, delivers no signal to terminal N of AND/NOT circuit 93. Terminal M of stop AND/NOT circuit 93 received no signal when the start signal set the first START-STOP flip-flop 56 to "one." Stop AND/NOT circuit 93, therefore, produces a signal which is inverted at inverter 94 and delivered as no signal to terminal M of stop one shot 95 to produce a negative pulse from terminal E of stop one shot 95 passed through OR circuit 97 to reset counter bits 77, 79 and 81 of counter 78 to "zero." The signal from stop AND/NOT circuit 93 after inversion by inverter 94 to no signal is also applied to forward punch AND/NOT circuit 99 at point H. Points F, J and K have previously had no signal applied so a signal is delivered from forward punch AND/NOT circuit 99 to read-out one shot 101 to cause a negative pulse from terminal E of read-out one shot 101 to set read-out flip-flop 102 to "one." Read-out flip-flop 102 set to "one" delivers no signals from terminal L to read-out AND/NOT circuits 190–194. The negative output pulse from read-out one shot 101 also causes punch-out shot 103 to deliver a negative pulse from terminal E to the clutch 201 of the paper tape punch to cause the number in the fourth column of the shift registers that have been decoded to be punched out. The decoding of the numbers in the fourth column of the shift registers is described in another portion of this description.

The negative pulse from punch-out one shot 103 also causes read-out shift one shot 105 to produce negative and positive pulses. The negative pulse from read-out shift one shot 105 resets read-out flip-flop 102 to close AND/NOTS 190–194. The negative pulse from read-out shift one shot 105 also is delivered to terminal M of shift one shot 73 to cause all of the numbers in columns one, two and three of the shift register to be shifted one column to the left and the number in column four to be shifted to column one in a manner which has been described previously. The negative pulse from shift one shot 73 complements counter bit 77 of counter 78 to "one" so that the counter 78 has counted the first punch-out. The negative pulse from shift one shot 73 is also applied to terminal J of forward punch AND/NOT circuit 99 to remove the output signal from terminal E; and as soon as the trailing edge of the pulse passes, no signal is again applied to terminal J to cause forward punch AND/NOT circuit 99 to deliver another signal to read-out one shot 101 causing another negative pulse to be produced at terminal E of read-out one shot 101. The negative output pulse from terminal E of read-out one shot 101 initiates the punch-out of the second number now in the fourth column in the identical manner described for the punch-out of the first number. Each time a number is punched out counter 78 counts one.

After the fourth number has been punched out, counter 78 has counted to four with counter bits 77 and 79 reset to "zero" and counter bit 81 set to "one" so that the E terminal of counter bit 77 and the L terminal of counter bit 81 apply no signals to count four AND/NOT circuit 107. No reset signal has been received so no signal is applied to terminal T of count four AND/NOT circuit 107; and terminal P delivers a signal, inverted by inverter 109, to terminal M of finish punch-out one shot 111 causing a negative and a positive pulse to be produced. The positive pulse from terminal L, after inversion by inverting amplifier 114, resets flip-flops 113, 73, 91 and 56 to zero. The negative pulse from terminal E of finish punch-out one shot 111 and after inversion by time delay 203, inversion by inverter 205, is amplified by amplifier 207 to energize coil 209 of the seven number. The positive pulse also causes punch-out one shot 103 to produce a negative pulse at terminal E to cause the clutch 201 to punch out the seven number. The number seven punch, by itself, is the carriage return on the tape, which returns the carriage on the teletypewriter after each number is printed out to arrange the numbers in a column on the paper when they are printed out.

SET UP OF APPARATUS FOR REVERSE START SIGNAL

As the number on an object is read in the reverse direction, the first signals are received on the two, four and seven input lines to cause triggers 51, 52 and 53 to deliver positive pulses to the second START-STOP AND/NOT circuit 89 to produce a signal setting the second START-STOP flip-flop 91 to "one." The output signal from terminal E of the second START-STOP flip-flop 91 is inverted by inverter 57 so that no signal is applied to reset AND/NOT circuit 59 on terminal R and no signal to shift AND/NOT circuit 61 on terminal H.

At this time, terminals T and U of reset AND/NOT circuit 59 also have no signal applied. As soon as the pulses produced by the triggers cease, no pulses are applied to OR circuit 63; and no signal is applied to terminal U of reset AND/NOT circuit 59; and a signal is applied to reset one shot 65 to produce a positive pulse on terminal L and a negative pulse on terminal E.

The negative pulse is applied to AND/NOT 74 for a purpose which will be seen later in the description.

The positive pulse from terminal L is (1) applied to terminal Y of reverse AND/NOT circuit 119 (which also has no signal applied to terminal Y as the second START-STOP flip-flop 91 has been set to "one") to produce a signal to set reverse flip-flop 117 to "one," (2) inverted by inverting amplifier 67 and applied to the H terminals (reset) of all of the shift register bits to reset them to "zero" and (3) inverted by inverting amplifier 67, inverted by inverter 68 and inverted by inverting amplifier 69. The signal from inverting amplifier 69 resets input control flip-flop 125 to "zero" so that no signal is applied to input AND/NOT circuits 130–134 from terminal E, resets reverse shift flip-flop 145 to "zero," resets counter bits 147, 149, 151, 77, 79 and 81 to "zero," and resets stop shift flip-flop 83 to "zero."

Reverse flip-flop 113 set to "one" applies a signal to terminal R of reset AND/NOT 59 so that it produces no signal while the number is received. Reverse flip-flop 113 set to "one" also applies no signal to terminal K of reverse punch AND/NOT 119, and the signal from terminal E is inverted and applied as a signal to terminal F of shift AND/NOT 61. Terminals H, J and K of shift AND/NOT 61 all receive no signal; so as terminal F goes to no signal, a signal is produced to cause shift one shot 73 to produce a pulse to shift all of the numbers in the shift register. However, as there is nothing in the shift register, nothing happens. Here the negative pulse from terminal E of reset one shot 65 blocks the AND/NOT circuit 74 so no signal is delivered to counter 78 and no count is effected.

The identification apparatus has thus been set up for the recipt of the first number.

RECEIPT OF FIRST NUMBER

For illustrative purposes, assume that the number read by the photocells is 2. Signals are received on the two and check input lines, amplified and applied to triggers 51 and 54 to produce positive (no signal) pulses on terminals L and negative (signal) pulses on terminals E of triggers 51 and 54. The positive (no signal) pulses are applied to the N terminals of input AND/NOT circuits 131 and 134 (no signal is applied to the M terminals from terminal E of input flip-flop 125) to produce a signal from terminal L of input AND/NOT circuits 131 and 134 and set shift register bits 151 and 181 to "one."

As soon as the negative (signal) pulses from triggers 51 and 54 pass, OR circuit 63 applies no signal to terminal K of shift AND/NOT circuit 61. Terminals F, H and J also have no signal applied so shift AND/NOT circuit 61 delivers a signal to terminal F of shift one shot 73 to produce a negative pulse on terminal E of shift one shot 73 which is inverted by inverting amplifier 75 and (1) applied to the J input terminals of all of the shift register bits to shift the number in the first column to the second column, and (2) inverted by AND/NOT circuit 74, inverted again by inverter 76, and applied to the J input terminal (complement input) of counter bit 77 to complement that counter bit to "one" so that a count of one rests in counter 78.

The second and third numbers are read into the shift registers in a similar manner. After the second number has been read in, a pulse is generated by shift one shot 73 to shift the numbers in the shift register to the second and third column and to count to two in counter 78. After the third number has been read in, again a pulse is generated by shift one shot 73 to shift the first, second and third numbers in the shift registers into the second, third and fourth columns of the shift registers, and to count to three in the counter 78.

Counter 78, after it has counted to three, has counter bit 77 set to "one," counter bit 79 set to "one," and counter bit 81 reset to "zero." Stop shift AND/NOT circuit 85 thus receives no signal on either input terminal and produces a signal to set stop shift flip-flop 83 to "one" so that a signal is derived from terminal F of stop shift flip-flop 83 through OR circuit 87 to terminal K of shift AND/NOT circuit 61. The fourth number is read into the first column of the shift register, and as a signal is applied to terminal K of shift AND/NOT circuit 61, no signal is delivered to shift one shot 73 so that none of the numbers are shifted in the shift registers. All four numbers now rest in the four columns of the shift registers.

Stop shift flip-flop 83 is set to "one" so no signal is produced from terminal L, inverted by time delay 121 to a signal, inverted to no signal by inverter 122, and no signal is applied to terminal N of input AND/NOT circuit 123. The time delay 121 delays the no signal until after the fourth number has been read into the first column of the shift registers.

The negative pulse passed by OR circuit 63, resulting from the fourth number read, causes input control one shot 127 to deliver a positive pulse to terminal M of input control AND/NOT circuit 123 so that no signal is applied to either terminal and a signal is produced to set input control flip-flop 125 to "one." A signal is delivered from terminal E of input control flip-flop 125 to input terminals M of input AND/NOT circuits 130–134 so that the stop signal will not affect the shift registers.

The stop signal is received on the one, four and check input lines and causes triggers 50, 52 and 54 to deliver positive pulses to the first START-STOP AND/NOT circuit 55 to produce a signal setting the first START-STOP flip-flop 56 to "one." The first START-STOP flip-flop 56 set to "one" applies no signal to terminal M of stop AND/NOT circuit 93 from its L terminal; and as the second START-STOP flip-flop 91 remains set to "one," no signal is applied to terminal N of stop AND/NOT circuit 93. Stop AND/NOT circuit 93, therefore, produces a signal which is inverted at inverter 94 and delivered as no signal to terminal M of stop one shot 95 to produce a negative pulse from terminal E of stop one shot 95 passed through OR circuit 97 to reset counter bits 77, 79 and 81 of counter 78 to "zero." The signal from stop AND/NOT 93, after inversion by inverter 94, is applied as no signal to terminal F of reverse punch AND/NOT circuit 119. Terminals H, J and K also have no signal applied so reverse punch AND/NOT circuit 119 produces a signal, inverted and delayed by inverting time delay 135 to a signal, inverted by inverter 136 to no signal, and applied to reverse read-out AND/NOT circuit 137. As counter bits 77 and 79 have been reset to "zero," a signal is applied to terminals U and V of reverse read-out AND/NOT circuit 137 so that reverse read-out AND/NOT circuit 137 does not produce a signal at this time. The no signal from inverter 136 is inverted and delayed by inverting time delay 138 to a signal, inverted to no signal by inverter 139, and applied to terminal F of start reverse shift AND/NOT circuit 155. Terminal H of start reverse shift AND/NOT circuit 155 has no signal applied so start reverse shift AND/NOT circuit 155 delivers a signal to read-out shift one shot 105 producing a negative pulse from terminal E which is delivered to terminal M of shift one shot 73 causing a negative pulse to be produced. The negative pulse from shift one shot 73 inverted by inverting amplifier 75 shifts all numbers in the shift registers one column to the right and the numbers in the fourth column to the first column and causes count of one to be counted in counter 78. The negative pulse from terminal E of shift one shot 73 is also applied to terminal H of reverse punch AND/NOT circuit 119; and as it returns to no signal, is inverted and delayed by the inverters and time delays and causes reverse shift AND/NOT circuit 143 to produce a signal to cause read-out shift one shot 105 to again apply a negative pulse to shift one shot 73 to continue the shifting and counting. The time delays 136 and 138 are necessary to allow the shift and count to take place before another pulse is produced by shift one shot 73. The operation described continues with the numbers shifted in the shift register until counter 78 has counted to three and the number originally in column one has been shifted to column four.

After counter 78 has counted three, counter bits 77 and 79 are set to "one" and apply no signal to terminals U and V of reverse read-out AND/NOT circuit 135. The third negative pulse from shift one shot 73 has shifted all of the numbers in the shift registers and has caused counter 78 to count to three. The same pulse has been delayed by time delay 135; and when it is applied to terminal T of reverse read-out AND/NOT circuit 137 as a no signal, counter bits 77 and 79 have both been set to "one" so that terminals U and V of reverse read-out AND/NOT circuit 137 also have no signal applied. Therefore, reverse read-out AND/NOT circuit 137 produces a signal to set reverse read-out flip-flop 145 to "one," causing counter 146 to count to one and resetting all of the counter bits of counter 78 to "zero." The positive going signal from terminal W of flip-flop 145 is also applied to terminal M of read-out one shot 101 to initiate a punch-out cycle punching out the number in the fourth column of the shift registers in the manner described before. The punch-out operation continues as described until all four numbers have been punched out and counter 146 counts to four. Counter 146, after it hs counted to four, has counter bit 149 set to "one," applying no signal to finish punch-out AND/NOT circuit 156 and causing a signal from terminal P of finish punch-out AND/NOT circuit 156, inverted by inverter 109, to be applied to terminal M of finish punch-out one shot 111. The positive pulse from terminal L resets flip-flops 56, 91, 93 and 113 to "zero" eliminating further punch-out. The negative pulse from terminal E of finish punch-out one shot 111; and after inversion by time delay 203, inversion by inverter 205, is amplified by amplifier 207 to energize coil 209 of the seven punch. The positive pulse also causes punch-out one shot 103 to produce a negative pulse at terminal E to cause the clutch 201 to punch out the seven number. The number seven punch, by itself, is the carriage return on the tape which returns the carriage on the teletypewriter after each number is printed out to arrange the numbers in a column on the paper when they are printed out.

Coils 231, 233, 235, 209, 237 and 201, when energized, close corresponding contacts 240–245 to energize the coils in the punch. The coils in the punch, when energized in conjunction with the energization of clutch coil 241 to close contacts 245 cause the clutch to be actuated and corresponding punches to be made in a paper tape.

DECODING OF THE SHIFT REGISTER

The numbers read from the moving object are coded in a two out of five code with two inputs for each decimal number and must be decoded before the decimal number may be punched into the paper tape. The two out of five code is as follows:

| Decimal: | Code in two out of five |
|---|---|
| 0 | Four and seven. |
| 1 | One and check. |
| 2 | Two and check. |
| 3 | One and two. |
| 4 | Four and check. |
| 5 | One and four. |
| 6 | Two and four. |
| 7 | Seven and check. |
| 8 | One and seven. |
| 9 | Two and seven. |

Decoders 211 and 213, shown in detail in FIG. 5, effect the decoding in the following manner. The "one" and "zero" output terminals of the last column of the shift register are connected to their respective "one" and "zero" input terminals of decoders 211 and 213 in the manner shown in accordance with the two out of five code; and the coded numbers resting in the last column of the shift registers are converted, producing an output signal in one of the output terminals of decoders 211 and 213, representing the proper decimal number.

For example, if the one and check shift registers 144 and 184 are set to one representing decimal one, shift registers 154, 164 and 174 remain set to zero, and signals are applied to terminals J (check), N (1), U (2–0), W (4–0) and Y (7–0) of decoder 211 and terminals J (c), R (7–0), U (4–0), V (1) and Y (2–0) of decoder 213, causing an output signal to be produced on terminal H (decimal 1) of decoder 211. The following table tabulates the signals received on the terminals of the decoders to produce a decimal output:

| | Decimal Number Output | | Signals Received | |
|---|---|---|---|---|
| | Terminal | Number | | |
| Decoder 211 | E | 0 | L (c–0) R (1–0) U (2–0) | V (4) X (7) |
| Decoder 211 | H | 1 | V (c) N (1) U (2–0) | W (4–0) Y (7–0) |
| Decoder 211 | K | 2 | J (C) R (1–0) T (2) | W (4–0) Y (7–0) |
| Decoder 211 | M | 6 | L (C–0) R (1–0) T (2) V (4) | Y (7–0) |
| Decoder 211 | P | 8 | L (C–0) N (1) U (2–0) | W (4–0) X (7) |
| Decoder 213 | E | 3 | L (C–0) R (7–0) U (4–0) | U (1) X (2) |
| Decoder 213 | H | 7 | J (C) N (7) U (4–0) | W (1–0) Y (2–0) |
| Decoder 213 | K | 4 | J (C) R (7–0) T (4) | W (1–0) Y (2–0) |
| Decoder 213 | M | 5 | L (1–0) R (7–0) T (4) | U (1) Y (2–0) |
| Decoder 213 | P | 9 | L (C–0) N (7) U (4–0) | W (1–0) X (2) |

The circuit suitable for use as decoders 211 and 213 is shown in FIG. 5.

If only one input is received by a decoder from "one" output of a shift register, no output is produced from a decoder. The outputs from decoder 211 are applied to OR circuit 215 and the outputs from decoder 213 are applied to OR circuit 217. The outputs from OR circuits 215 and 217 are inverted by inverter 219 and applied to OR circuits 221 and 223 to effect an error punch in a manner to be described. The error signal will be delivered by inverter 219 only if no output is produced by either decoder indicating that at least two inputs were not received.

PUNCH-OUT OF DECODER

After the coded input has been converted into decimal numbers, it must be recorded. In this particular embodiment, it is recorded by punching into a paper tape. As the paper tape punch has another five punch code which is different from the input two out of five code, the decimal number must be converted into the paper tape punch code. The paper tape code is as follows with an "X" placed in the column where a punch should be made:

| Decimal | Paper Tape Code | | | | |
|---|---|---|---|---|---|
| | 1 | 2 | 3 | 4 | 5 |
| error | | X | | | |
| 0 | X | X | X | | X |
| 1 | X | X | | | X |
| 2 | X | X | | | X |
| 3 | X | | | | |
| 4 | | X | | X | |
| 5 | | | | | X |
| 6 | X | | X | | X |
| 7 | X | X | X | | |
| 8 | | X | X | | |
| 9 | | | | X | X |
| shift | | | | X | X |

The decoding of the decimal number is accomplished in a straightforward manner as shown. The output signal representing the decimal number is applied to one or more OR circuits associated with the desired punches, passes through the OR circuits, inverted by inverters, inverted again by AND/NOT circuits; and after amplification, energizes coils to cause the appropriate punches to be made. For instance, the output signal from terminal H of decoder 213 representing decimal 7 passes through OR circuits 221, 223 and 225, inverted by inverters 241, 243 and 245, inverted again by AND/NOT circuits 190, 191 and 192; and after amplification, energizes coils 231, 233 and 235 to cause punches to be made in columns 1, 2 and 3 of the paper tape representing decimal 7. The signal representing an error from OR circuit 219 passes through OR circuits 221 and 223; and after inversion by inverters 241 and 243, and amplification, energizes coils 231 and 233 to cause punches to be made in columns 1 or 2 representing a ---, which indicates an error has been made.

The paper type may be fed to a paper tape decoder to typewriter to print out the numbers read or sent over teletype.

A communication system for communicating data from a first to a second location during relative movement between the two locations has been described. An inexpensive predetermined pattern may be placed on one of the locations where there are a large number of locations of one type involved. The data may be communicated without regard to the relative movement of the two locations and always read out in a forward order whether communicated in a forward or reverse order. The communication may not start unless a start signal is communicated and stops when a stop signal is communicated. The communication is automatic and accurate.

TEST FACILITIES

The system may be tested manually by closing selective switches 252 and thus applying signals through the manual switches 260–264 to the triggers. Input signals may be simulated in this manner with the start, identification and stop signals simulated. The system may thus be tested.

Time reset relay 250 is normally closed and opens a few seconds after a signal is applied to it. Its purpose is to insure that the system will be reset before the first railroad car arrives.

DETAILED DESCRIPTION OF DECODER

Figure 4A:
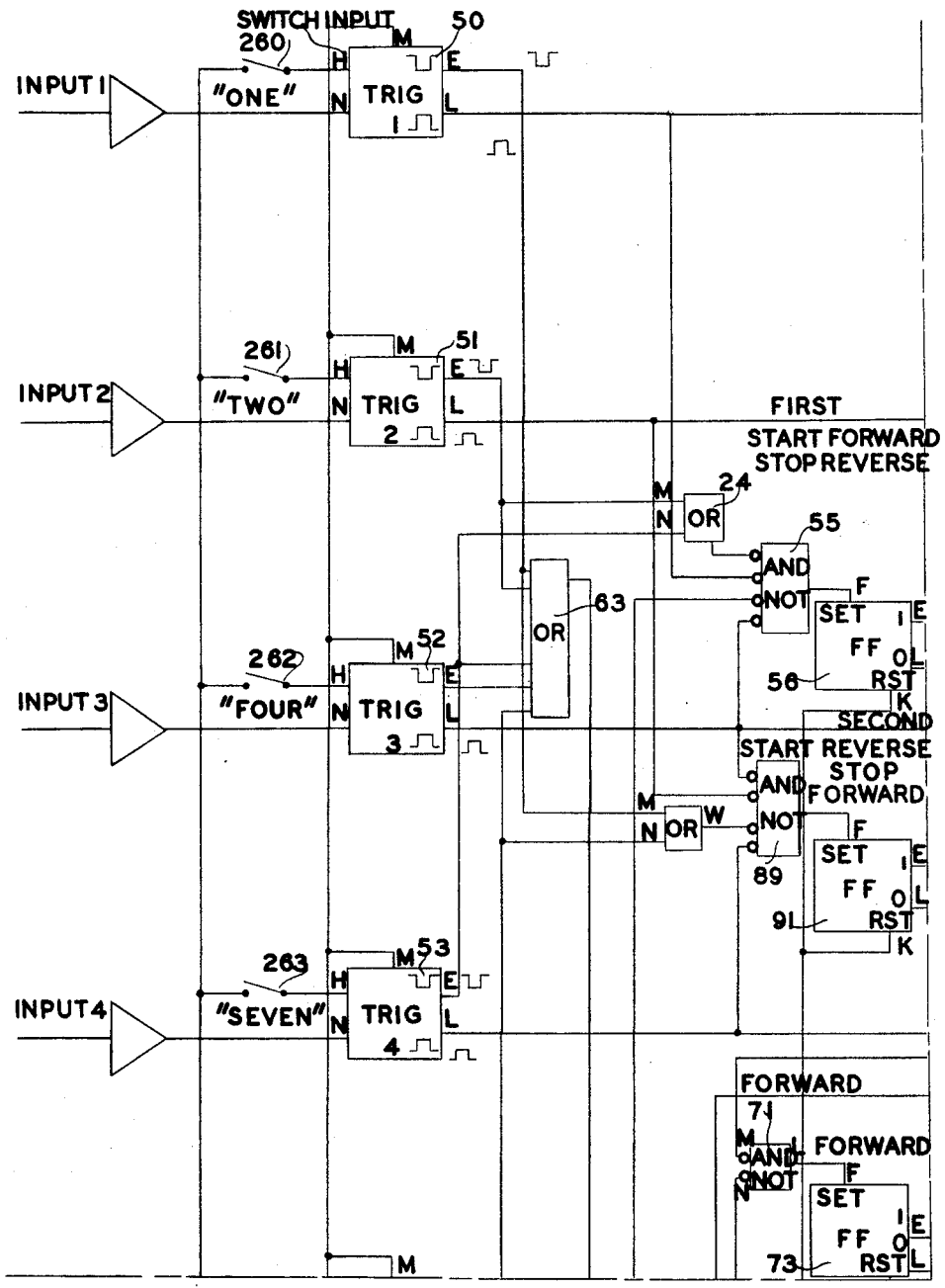
FIGURE 4 shows how to put FIGURE 4a through 4h together.
Figure 4B:
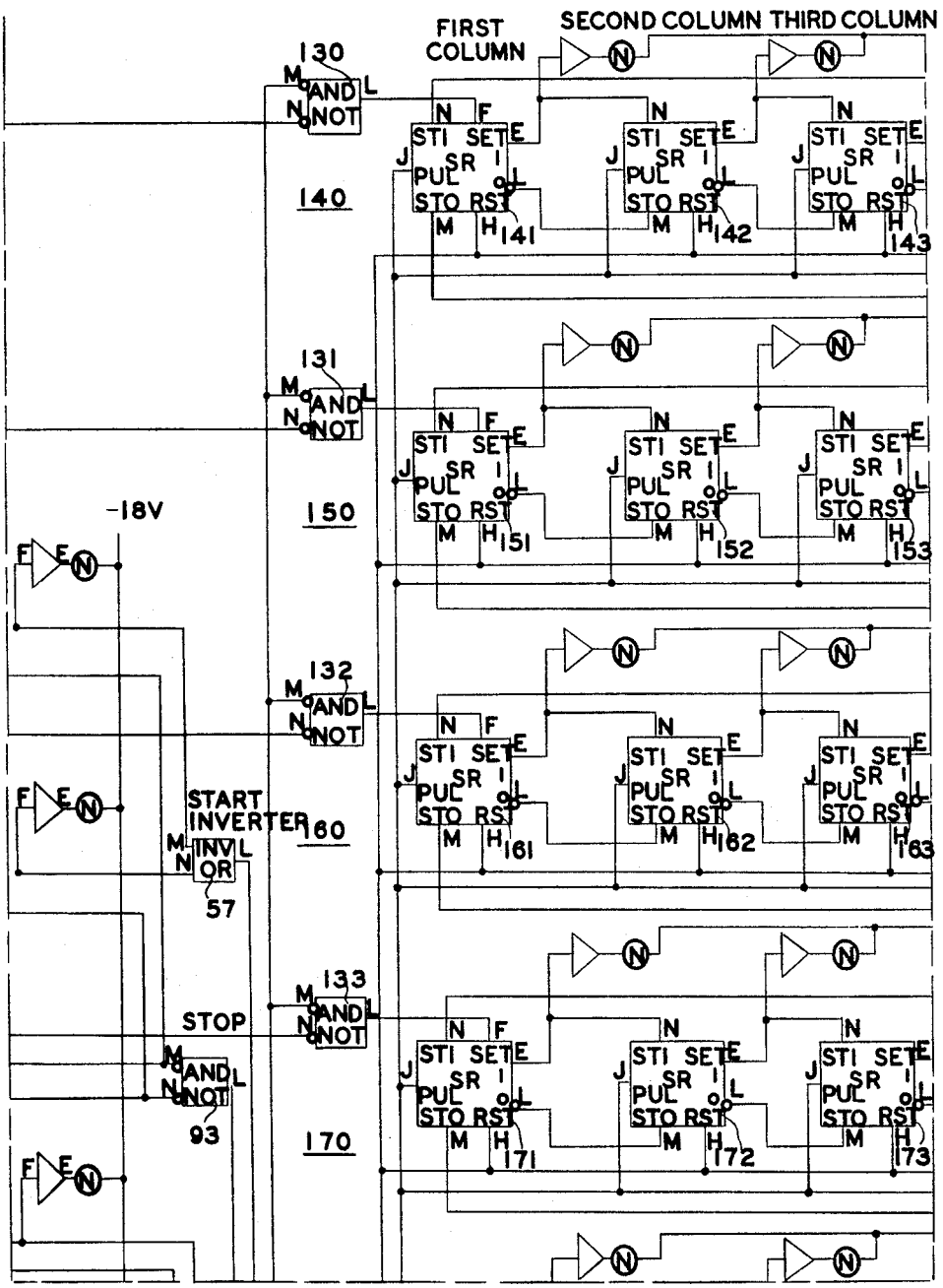
Figure 4C:
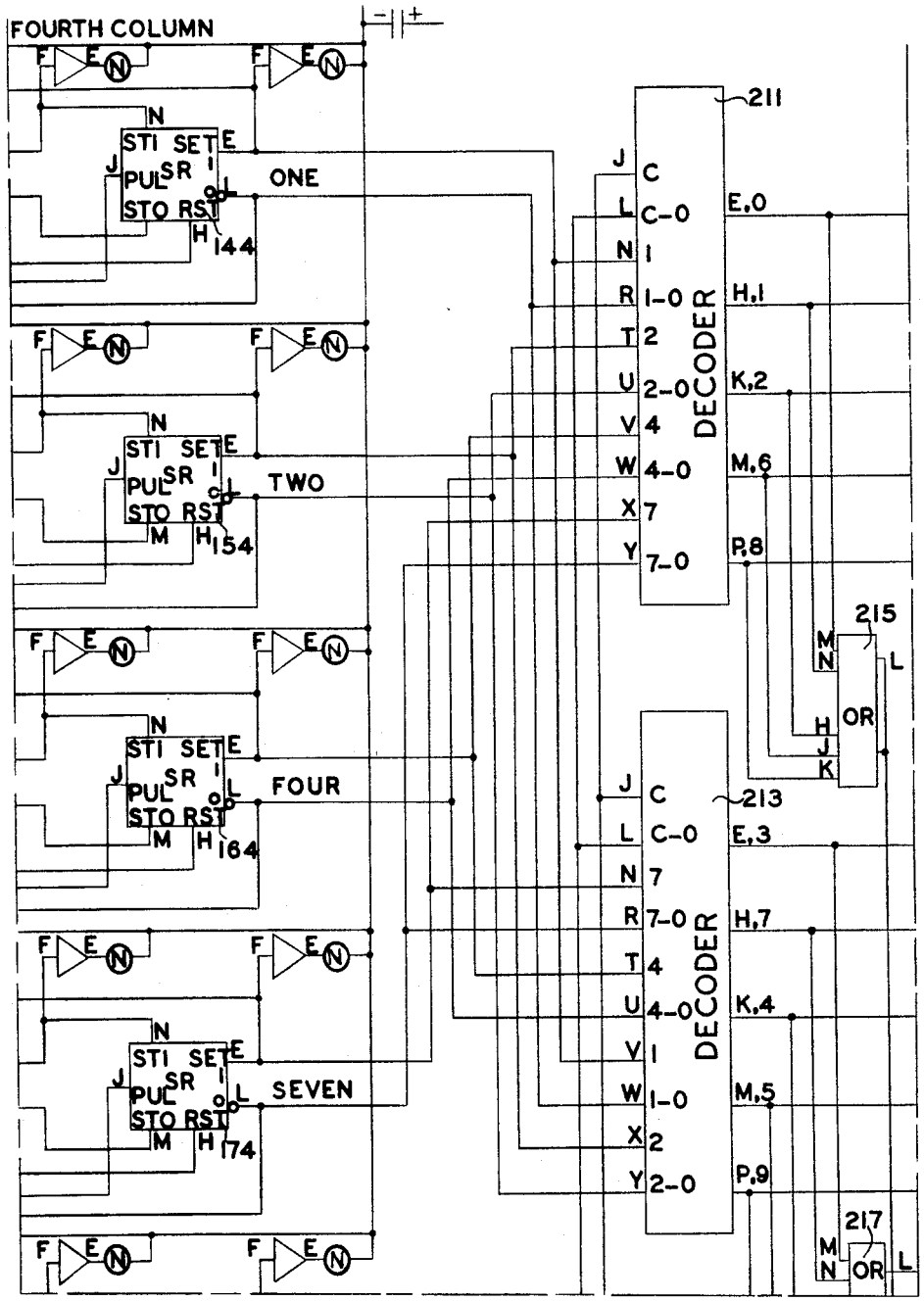
Figure 4D:
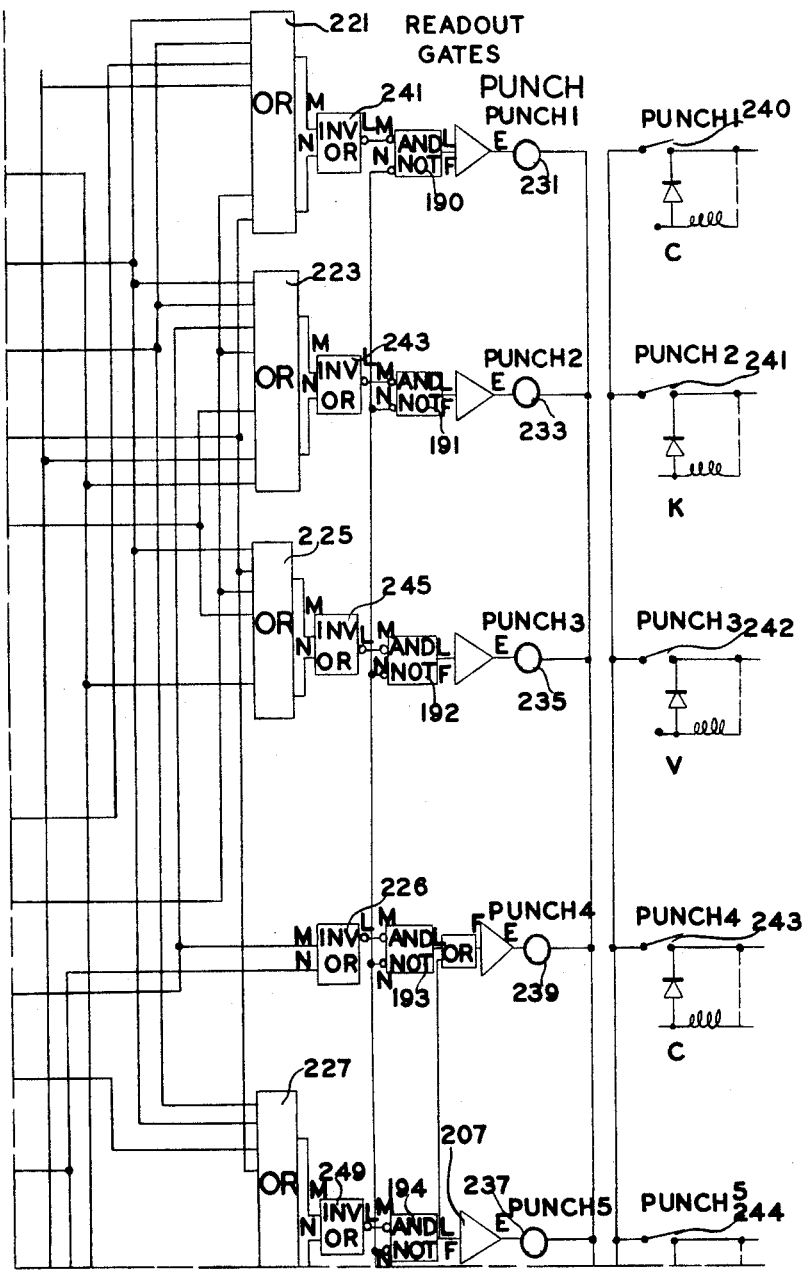
Figure 4F:
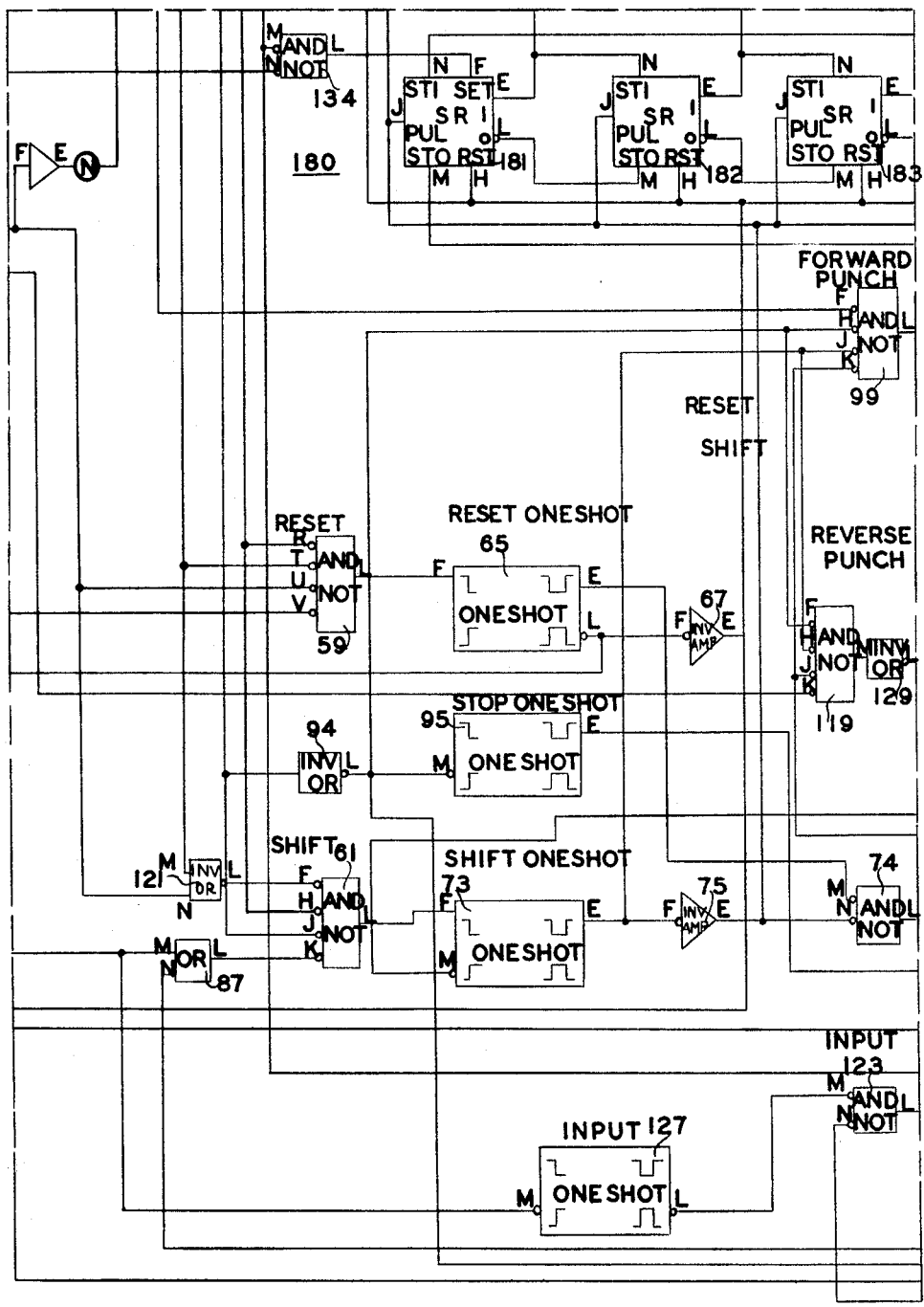
Figure 4G:
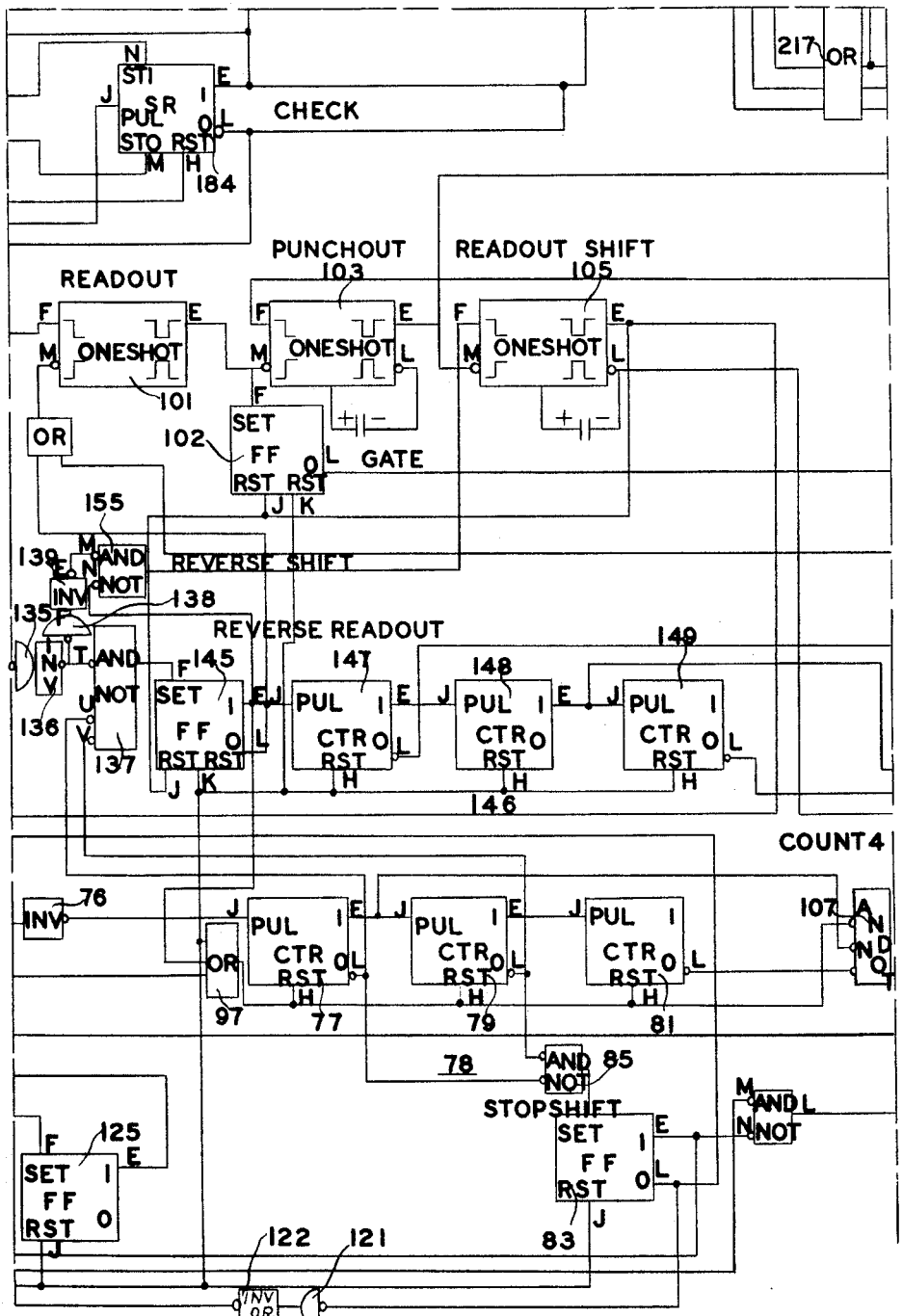
Figure 4H:
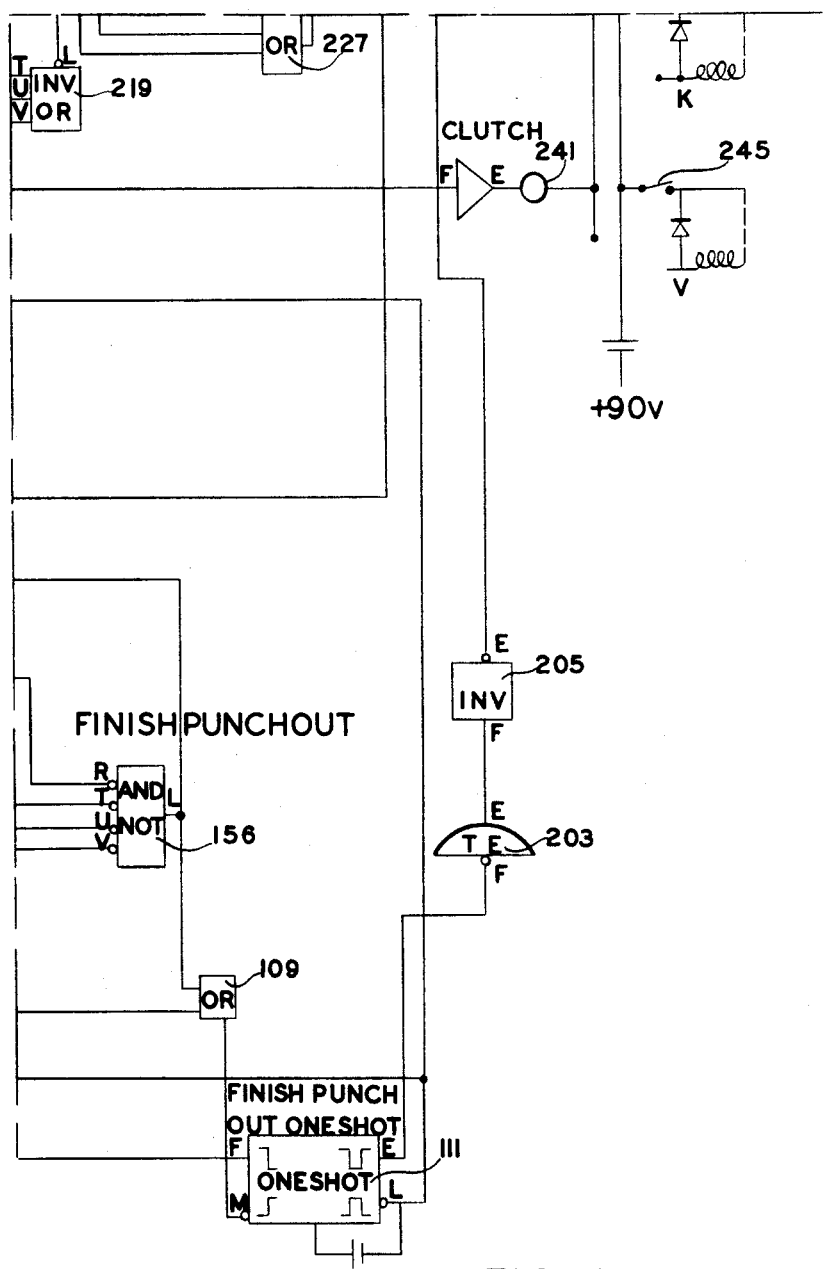

Referring now to FIG. 5 for a detailed description of a decoder such as decoder 211 or 213 in FIG. 4c, signals may be applied to terminals F, J, L, N, R, T, U, V, W, X, and Y; and signals are produced on terminals E, H, K, M, and P. To produce a signal on an output terminal, no signal is applied on a terminal connected to the base of a transistor having its collector connected to the output terminal, and the transistor stays on. The transistor is turned off if a signal is applied to its base.

Normally only one output signal is produced by the decoder at a time. For example, to produce a signal on terminal E signals are applied to terminal L, turning off transistors 231 and 232, so no signal is produced from terminals H and M; to terminal R so transistor 234 is turned off and no signal is produced by terminal P; to terminal U, turning off transistor 233, so no signal is produced at terminal M; and to terminals V and Y. No signals are applied to terminals F, J, N, T, W, or Y so no signal is applied to the base of transistor 230 and it remains on, current flows through the collector of transistor 230 and a signal is produced from terminal E. Signals may be produced at the other output terminals in a similar manner as determined by the signals applied to the input. Numbers may thus be decoded.

BINARY COUNTER BIT

FIGURE 6 shows a detailed schematic of a binary counter bit. A binary counter is a bistable multivibrator with a set input F and a reset input H. If the left hand transistor is conducting, the "zero" output terminal L will be at zero volts, and the right hand transistor will not be conducting and the "one" output terminal E will be clamped to $-6$ volts. A positive going signal complementing input terminal J will cut the left hand conducting transistor off and change the RC coupling network for the "zero" output terminal L to $-6$ volts, and cut the right hand nonconducting transistor on and change the "one" output terminal to zero volts. Each positive going signal to input terminal causes the output terminals to change. A positive going signal applied to set terminal F causes "one" output terminal E to go to $-6$ v. and "zero" output terminal L to go to zero volts, and a positive going signal to reset terminal H causes "one" output terminal E to go to zero volts and "zero" output terminal L to go to $-6$ volts.

SHIFT REGISTER

The shift register bit is shown in detail in FIGURE 7. The operation of the shift register is similar to that of the binary counter except that at the time a positive going signal is applied to input terminal, a signal must also be applied to one of the steering terminals N or M. A signal applied to the steer one terminal M and a positive going signal applied to terminal J causes the shift register to be set to "one" with a $-6$ v. signal on the "one" output terminal E. A signal applied to the steer zero terminal N and a positive going signal applied to terminal J causes the shift register to be reset to "zero" with a $-6$ v. signal on the "zero" output terminal L. For example, if the shift register has been set to "one" so that transistor $4_1$ is conducting, the "one" output terminal produces a $-6$ v. signal and then a $-6$ v. signal is applied to zero terminal M, and O $-6$ v. pulse is applied to terminal J, capacitor $C_1$ charges to $-6$ v. and when the pulse to terminal J returns to zero, the capacitor $C_1$ discharges, cutting transistor $4_1$ off and turning transistor $4_2$ on so that the shift register is reset to "zero" and a $-6$ v. signal is produced on the "zero" output terminal L.

The shift register is set and reset in the same manner as the counter bit.

TRIGGER

A schematic of a trigger is shown in FIGURE 8. An input waveform on terminal J causes a negative going pulse to be produced on output terminal E and a positive going pulse to be produced on terminal L.

ONE SHOT PULSE GENERATOR

A schematic of a one shot pulse generator is shown in FIGURE 9. A negative going pulse or negative stop change in a D.-C. input or input terminal F or a positive going pulse or a positive stop change in D.-C. input on input terminal M triggers the one shot pulse generator to produce a pulse with a negative going loading edge on output terminal E and a pulse with a positive going loading edge on output terminal L. Both output pulses are produced at the same time with a signal on either input. Transistors A, C and D are normally conducting, and transistor B is normally cut off. Transistor A acts as an inverter and makes possible the inverted input to the circuit. Transistor D also acts as an inverter and provides for the negative output pulse. The two diodes in the base circuit of transistor B compose an OR circuit allowing either the normal or the inverse input to change the state of transistor B. Transistor C acts as a time delay lockup circuit for transistor B. The time delay circuit is composed of the capacitors, resistors, and potentiometer in the collector circuit of transistor B and the base circuit of transistor C. Adding external capacity or adjusting the potentiometer will cause a change in output pulse width. The feedback path from the collector of transistor C to the base of transistor C to the base of transistor B through the 4.3K resistor is the time delay lockup circuit. Transistor B, which is normally cut off, will go into a conducting state upon application of either input pulse which will then cause transistor C and D to be cut off and remain cut off until the time delay circuit has timed out. Transistor B, being cut off, will hold transistor B (through the lockup path) cut on until the time delay causes transistor C to be cut on again which will then cut off transistor B and cut on transistor D.

The other circuits such as flip-flops, AND/NOT circuits and OR circuits are well known in the art and need not be described in detail.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. Apparatus for data communication from a moving object to a fixed location comprising:
   (a) means on said moving object for presenting a predetermined pattern,
   (b) reading means at said fixed location for reading said predetermined pattern for deriving a start signal, data numbers, and an order signal from said predetermined pattern,
   (c) storage means having a number of storage positions equal to the number of data numbers to be read by said reading means,
   (d) control means responsive to said start signal for causing each data number read to be stored in the first storage position of said storage means,
   (e) shift means responsive to the last read data number for shifting each data number to the succeeding position of said storage means,
   (f) reverse shift means responsive to said order signal when said data numbers have been read into said storage means in a reverse order for shifting the data number in the last position to the first position and the data numbers in the other positions to the next succeeding positions,
   (g) counter means responsive to each reverse shift to count each reverse shift and to produce a reverse shift finish signal when said counter has counted to N—1 where N equals the number of positions in said storage means,
   (h) said reverse shift means responsive to said reverse shift finish signal to cease shifting,
   (i) and read-out means responsive to said reverse shift finish signal to cause the data number in the last position of said storage means to be read out of said storage means.

2. Apparatus for data communication from a moving object to a fixed location comprising:
   (a) means on said moving object for presenting a predetermined pattern,
   (b) reading means at said fixed location for reading said predetermined pattern and for deriving a start signal, data numbers, and an order signal from said predetermined pattern,
   (c) storage means having a number of storage positions equal to the number of data numbers to be read by said reading means,
   (d) control means responsive to said start signal for causing each data number read to be stored in the first storage position of said storage means,
   (e) shift means responsive to the last read data number for shifting each data number to the succeeding position of said storage means,
   (f) counter means responsive to each shift to count the number of shifts and to produce a finish shift signal when the first data number read has been shifted to the last position of said storage means,
   (g) said shift means responsive to said finish shift signal to stop shifting said data numbers,
   (h) reverse shift means responsive to said order signal when said data numbers have been read into said storage means in a reverse order for shifting the data number in the last position to the first position and the data numbers in the other positions to the next succeeding positions,
   (i) reverse shift counter means responsive to each reverse shift to count each reverse shift and to produce a reverse shift finish signal when said counter has counted to N—1 where N equals the number of positions in said storage means,
   (j) and read-out means responsive to said reverse shift finish signal to cause the data number in the last position of said storage means to be read out of said storage means.

3. Apparatus for data communication from a moving object to a fixed location comprising:
   (a) means on said moving object for presenting a predetermined pattern,
   (b) reading means at said fixed location for reading said predetermined pattern and for deriving a start signal, data numbers, and an order signal from said predetermined pattern,
   (c) storage means having a number of storage positions equal to the number of data numbers to be read by said reading means,
   (d) control means responsive to said start signal for causing each data number read to be stored in the first storage position of said storage means,
   (e) shift means responsive to the last read data number for shifting each data number to the succeeding position of said storage means,
   (f) first counter means responsive to each shift to count the number of shifts and to produce a finish shift signal when the first data number read has been shifted to the last position of said storage means,
   (g) said shift means responsive to said finish shift signal to stop shifting said data numbers,
   (h) reverse shift means responsive to said order signal when said data numbers have been read into said storage means in a reverse order for shifting the data number in the last position to the first position and the data numbers in the other positions to the next succeeding positions,
   (i) reverse shift counter means responsive to each reverse shift to count each reverse shift and to produce a reverse shift finish signal when said counter has counted to N—1 where N equals the number of positions in said storage means,
   (j) read-out means responsive to said reverse shift finish signal to cause the data number in the last position of said storage means to be read out, (k) said reverse shift means responsive to the read-out of the data number in the last position of said storage means for causing the data number in the last position to be shifted to the first position and the other data numbers to be shifted to the next succeeding positions of said storage means, (l) and read-out counter means responsive to each reverse shift to count the number of reverse shifts and to cause the said read-out means to stop read-out when the last data number has been read out.

4. A freight car identification ssytem comprising:
(a) means on a freight car for presenting a predetermined pattern,
(b) photoelectric means at a wayside station for reading said predetermined pattern during relative movement between the two locations and deriving a start signal and identification numbers from said predetermined pattern,
(c) gating means responsive to said start signal to pass said identification numbers,
(d) and means for insuring that each identification number is derived from a predetermined number of signals.

5. A freight car identification system comprising:
(a) means on a freight car for presenting a predetermined pattern,
(b) photoelectric means at said second location for reading said predetermined pattern as the freight car passes the wayside station and deriving a start signal and identification numbers from said predetermined pattern,
(c) gating means responsive to said start signal to pass said identification number,
(d) and means for insuring that each identification number is derived from two and only two signals.

6. A freight car identification system comprising:
(a) means on said freight car for presenting a predetermined pattern,
(b) photoelectric means at a wayside station for reading said predetermined pattern as the freight car passes the wayside station and deriving a start signal, identification signals, and a stop signal from said predetermined pattern,
(c) storage means for storing said identification signals,
(d) gating means responsive to said start signal to pass said identification signals to said storage means,
(e) read-out means responsive to said stop signal for reading out said identification signals as data numbers,
(f) and means for insuring that the identification signals read out are composed of a predetermined number of signals.

7. A freight car identification system comprising:
(a) means on a freight car for presenting a predetermined pattern,
(b) photoelectric reading means at a wayside station for reading said predetermined pattern as the freight car passes the wayside station and for deriving a start signal, identification numbers, and an order signal from said predetermined pattern,
(c) storage means for storing said identification numbers,
(d) gating means responsive to said start signal to pass said identification numbers,
(e) control means responsive to said start signal for causing said identification numbers to be stored in said storage means in the order read,
(f) read-out means responsive to said order signal for causing said identification signals to be arranged in said storage means in a forward order and to be read out in a forward order,
(g) and means for insuring that each identification number is derived from a predetermined number of signals.

8. A freight car identification system comprising:
(a) means on a freight car for presenting a predetermined pattern,
(b) photoelectric reading means at a wayside station for reading said predetermined pattern as the freight car passes the wayside station and for deriving a start signal, identification numbers, and an order signal from said predeterminel pattern,
(c) storage means having a number of storage positions equal to the number of identification numbers to be read by said reading means,
(d) gating means responsive to said start signal to pass said identification numbers,
(e) control means responsive to said start signal for causing each identification number read to be stored in the first storage position of said storage means,
(f) shift means responsive to the last read identification number for shifting each identification number to the succeeding position of said storage means,
(g) means for insuring that each identification number is derived from a predetermined number of signals,
(h) and read-out means responsive to said order signal to cause the identification numbers to be read out of said storage means.

9. A freight car identification system comprising:
(a) means on a freight car for presenting a predetermined pattern,
(b) photoelectric reading means at a wayside station for reading said predetermined pattern and for deriving a start signal, identification numbers, and an order signal from said predetermined patterns,
(c) storage means having a number of storage positions equal to the number of identification numbers to be read by said reading means,
(d) gating means responsive to said start signal to pass said identification numbers,
(e) control means responsive to said start signal for causing each identification number read to be stored in the first storage position of said storage means,
(f) shift means responsive to the last read identification number for shifting each identification number to the succeeding position of said storage means,
(g) read-out means responsive to said order signal to cause the identification number in the last position of said storage means to be read out,
(h) said shift means responsive to the read-out of the identification number in the last position of said storage means for causing each identification number to be shifted to the succeeding position of said storage means,
(i) means for insuring that each identification number is derived from a predetermined number of signals,
(j) and counter means responsive to each shift to count the number of shifts and to cause the said read-out means to stop read-out when the last identification number has been read out.

10. A freight car identification system comprising:
(a) means on a freight car for presenting a predetermined pattern,
(b) photoelectric reading means at a wayside station for reading said predetermined pattern for deriving a start signal, identification numbers, and an order signal from said predetermined pattern,
(c) storage means having a number of storage positions equal to the number of identification numbers to be read by said reading means,
(d) control means responsive to said start signal for causing each identification number read to be stored in the first storage position of said storage means,
(e) gating means responsive to said start signal to pass said identification number,
(f) shift means responsive to the last read identification number for shifting each identification number to the succeeding position of said storage means, (f') reverse shift means responsive to said order signal when said data numbers have been read into said storage means in a reverse order for shifting the data number in the last position to the first position and the data numbers in the other positions to the next succeeding positions, (g) counter means responsive to each reverse shift to count each reverse shift and to produce a reverse shift finish signal when said counter has counted to N−1 where N equals the number of positions in said storage means, (h) said reverse shift means responsive to said reverse shift finish signal to cease shifting, (i) means for insuring that each identification number is derived from a predetermined number of signals, (j) and read-out means responsive to said reverse shift finish signal to cause said identification numbers to be read out of said storage means.

References Cited by the Examiner

UNITED STATES PATENTS

| | | | |
|---|---|---|---|
| 2,729,301 | 3/1956 | Greenfield | 340—146.1 |
| 2,942,778 | 7/1960 | Broido | 235—61.11 |
| 3,035,252 | 5/1962 | Malthaner | 340—172.5 |
| 3,036,291 | 5/1962 | Whittle | 340—172.5 |
| 3,044,695 | 7/1962 | Burr | 235—61.11 |
| 3,056,044 | 9/1962 | Kroos | 307—88.5 |
| 3,056,045 | 9/1962 | Ulrich | 307—88.5 |
| 3,106,706 | 10/1963 | Kolanowski et al. | 340—146.3 X |
| 3,117,754 | 1/1964 | Morganstern | 340—146.3 X |
| 3,145,291 | 8/1964 | Brainerd | 340—146.3 X |

MAYNARD R. WILBUR, *Primary Examiner.*

MALCOLM A. MORRISON, *Examiner.*

P. J. HIRSCHKOP, W. S. POOLE, R. COUNCIL,
*Assistant Examiners.*